No. 654,788. Patented July 31, 1900.
A. E. FEROE.
ALE OR BEER FILTER.
(Application filed Sept. 19, 1899.)
(No Model.) 5 Sheets—Sheet 1.

Witnesses
C. E. Hunt.
L. Parker Farrington.

Inventor
Alfred E. Feroe.
By Irving Whing
Attorney

No. 654,788. Patented July 31, 1900.
A. E. FEROE.
ALE OR BEER FILTER.
(Application filed Sept. 19, 1899.)
(No Model.) 5 Sheets—Sheet 2.
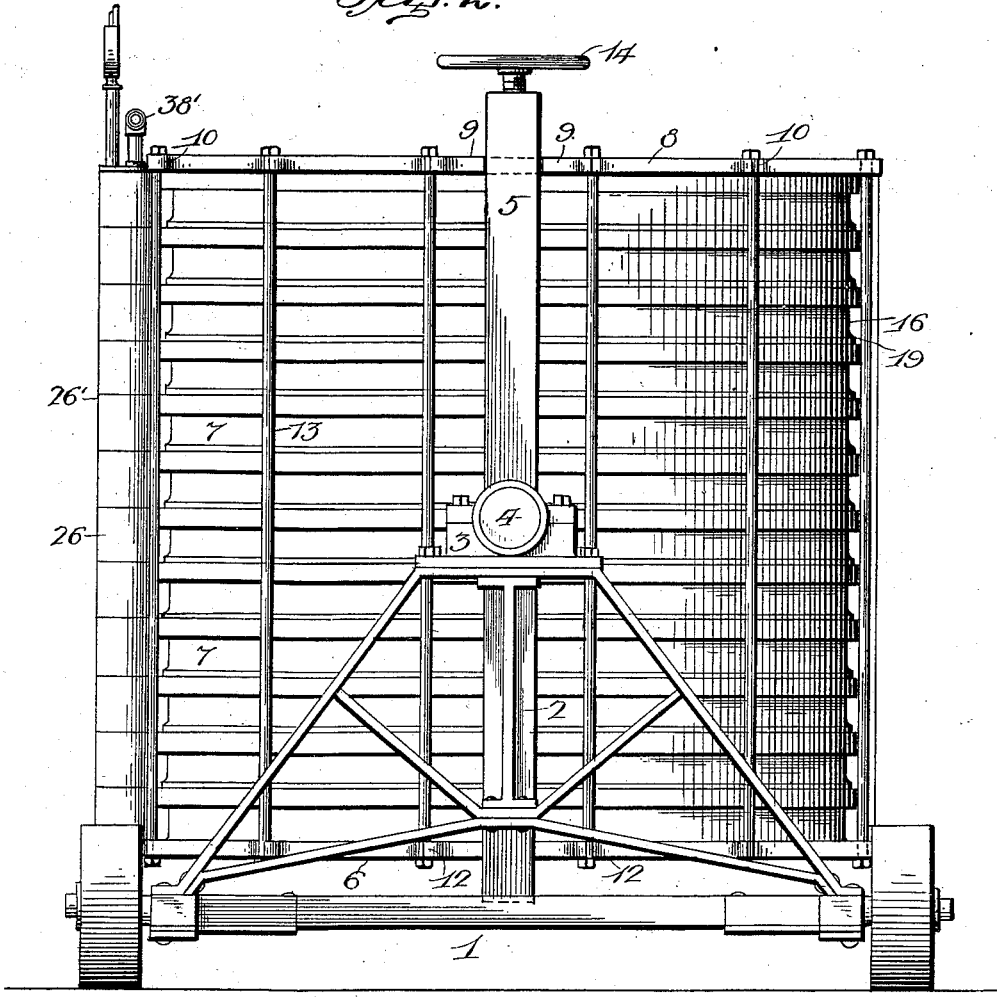
Witnesses
Inventor
Alfred E. Feroe
Attorney

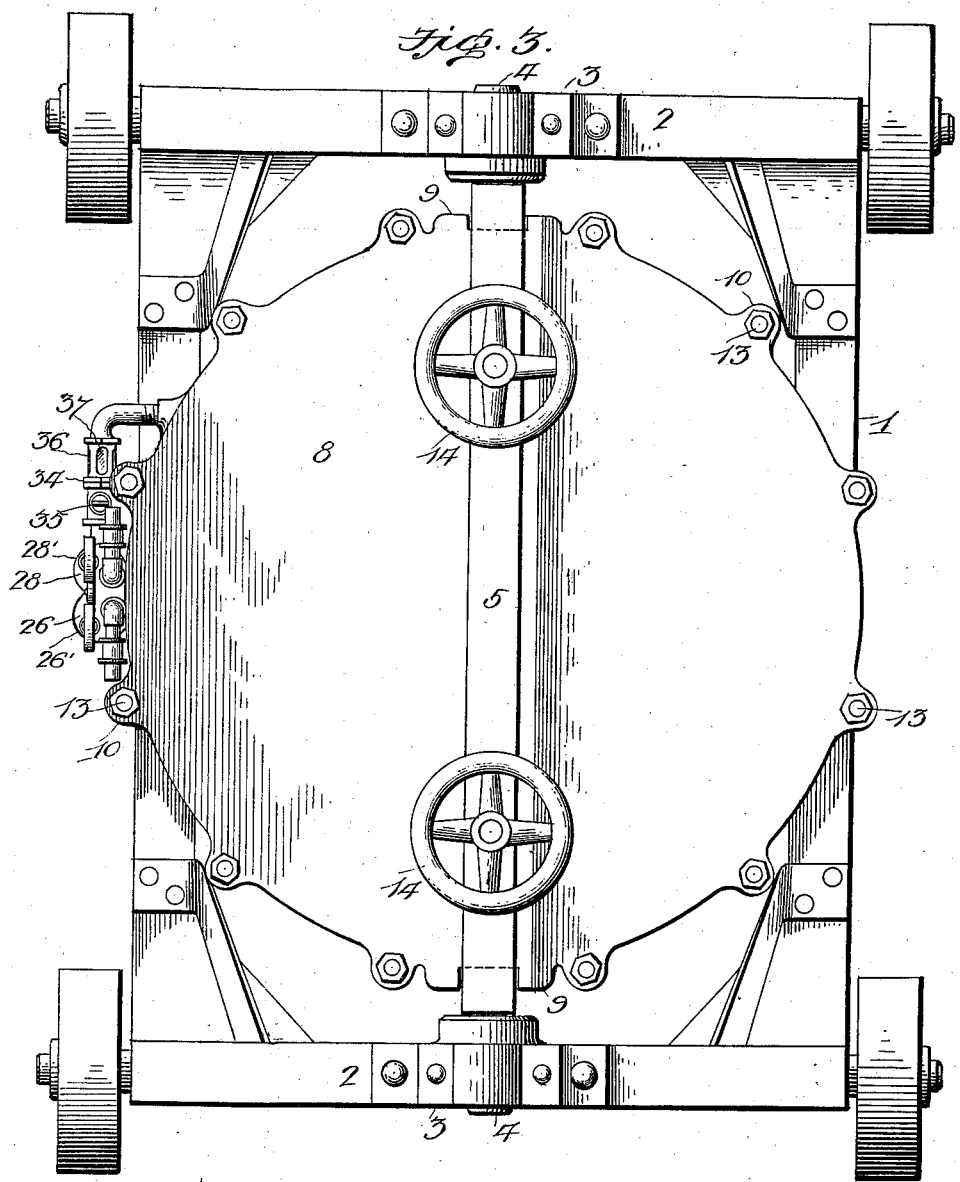

No. 654,788. Patented July 31, 1900.
A. E. FEROE.
ALE OR BEER FILTER.
(Application filed Sept. 19, 1899.)

(No Model.) 5 Sheets—Sheet 4.

Witnesses
C. E. Hunt.
L. Parker Farrington

Inventor
Alfred E. Feroe
By Irving Ulting Attorney

No. 654,788. Patented July 31, 1900.
A. E. FEROE.
ALE OR BEER FILTER.
(Application filed Sept. 19, 1899.)
(No Model.) 5 Sheets—Sheet 5.
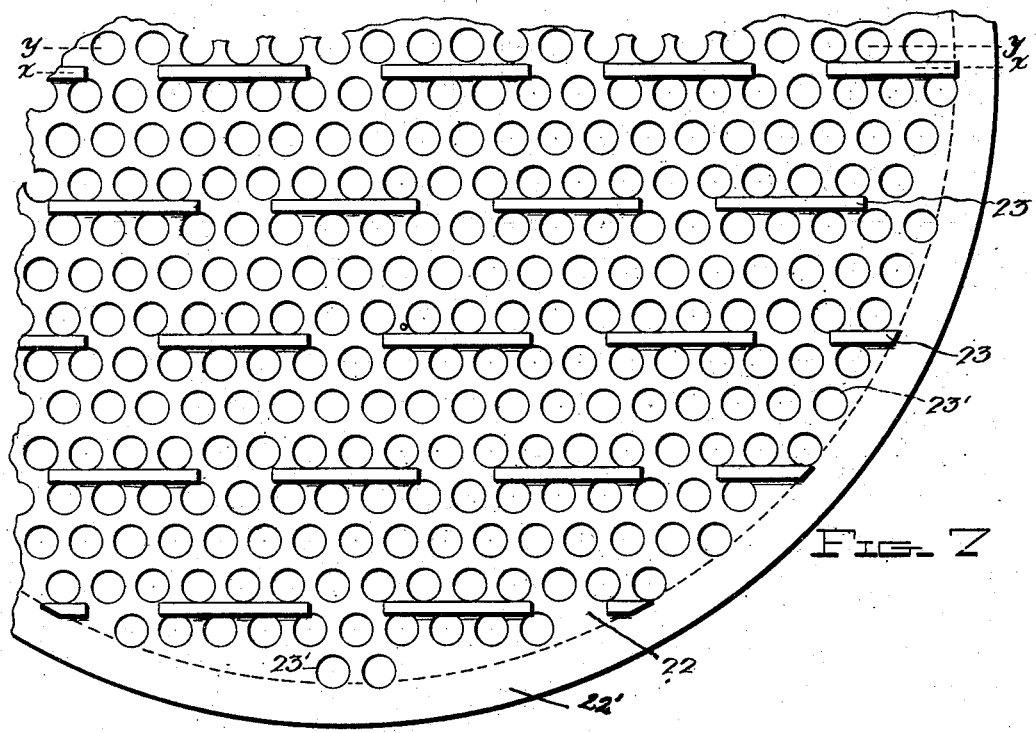
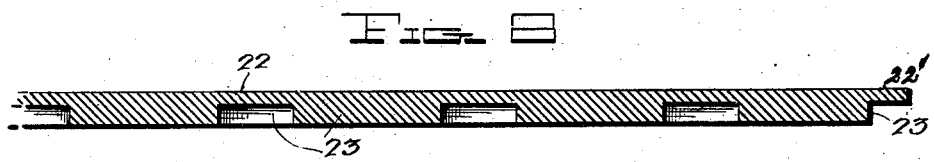
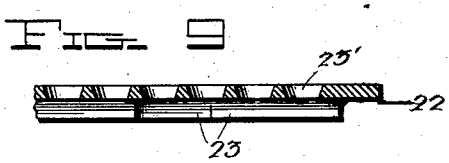
Witnesses
Inventor
Alfred E. Feroe,
by
Attorney.

UNITED STATES PATENT OFFICE.

ALFRED E. FEROE, OF TIVOLI, NEW YORK.

ALE OR BEER FILTER.

SPECIFICATION forming part of Letters Patent No. 654,788, dated July 31, 1900.

Application filed September 19, 1899. Serial No. 731,012. (No model.)

*To all whom it may concern:*

Be it known that I, ALFRED E. FEROE, a citizen of the United States, residing at Tivoli, in the county of Dutchess and State of New York, have invented new and useful Improvements in Ale or Beer Filters, of which the following is a specification.

My invention relates to an improved ale and beer filter for brewery use.

The object of my improvement is to provide a device of a very large capacity, simple in construction, strong, durable, and efficient in operation, and of as few parts as is consistent with perfect work.

To attain these ends the invention comprises a series of filter-sections which when put together form a series of compartments. Each compartment has inlet and outlet passages and means for filtration and is a complete filter in itself.

The invention further consists in the construction, combination, and arrangement of the several parts of the device, as will be hereinafter more fully described, and particularly pointed out in the claims.

Figure 1:
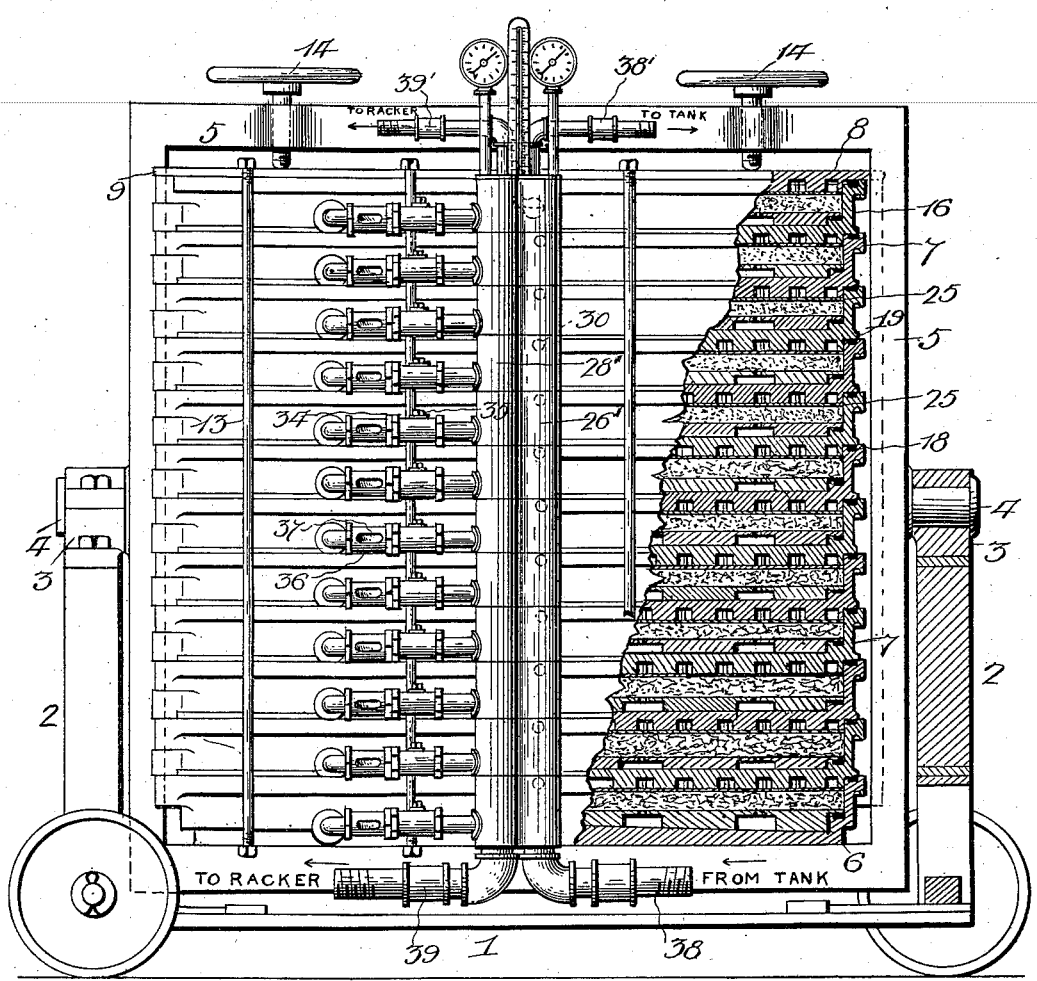
Figure 5:
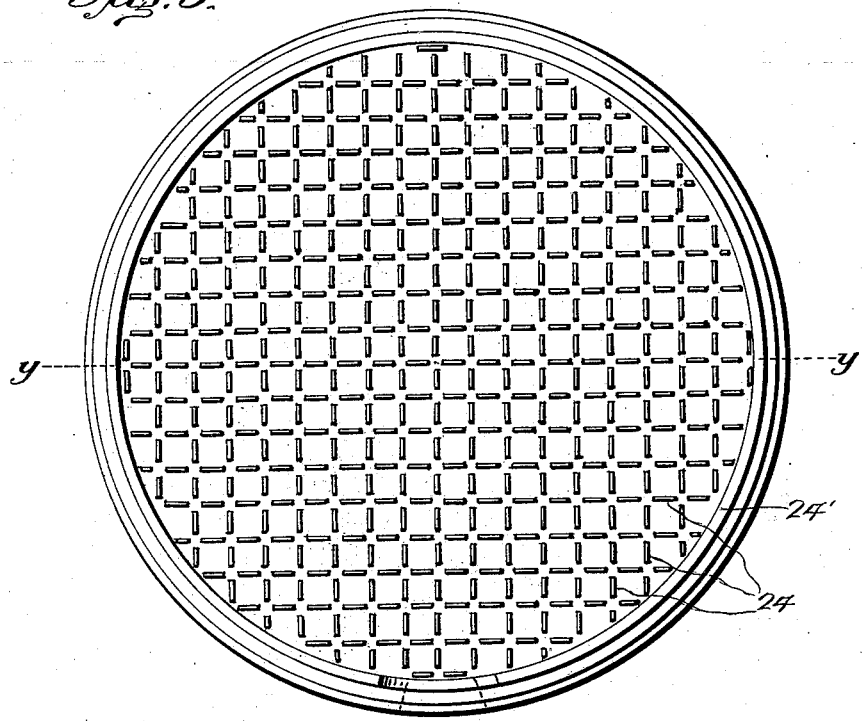
Figure 6:
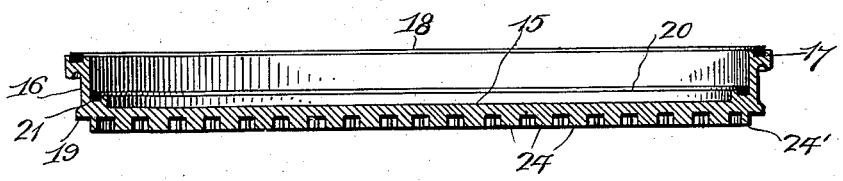

In the accompanying drawings, Figure 1 is a front elevation, partly in section, of my improved ale and beer filter. Fig. 2 is an end elevation of the same. Fig. 3 is a top plan view of the filter. Fig. 4 is a detail view showing the inlet and outlet ports of one of the filter-sections. Fig. 5 is a bottom plan view of one of the filter-sections. Fig. 6 is a transverse section on the line $y\ y$ of Fig. 5. Fig. 7 is an enlarged bottom plan view of the foraminous filter-plate or diaphragm. Fig. 8 is a detail section on the line $x\ x$ of Fig. 7. Fig. 9 is a similar view on the line $y\ y$ of Fig. 7.

In the drawings the same reference characters indicate the same parts of the invention.

1 denotes a carriage or truck mounted on suitable carrying-wheels for conveniently transporting the filter from place to place. This carriage is provided with vertical parallel brackets 2 2, which support the bearing-boxes 3 3, in which are journaled the trunnions 4 4 of the rectangular yoke or frame 5, in which the filter proper is removably secured.

6 denotes the bottom filter-section, which rests upon the yoke, and 7 7 denote a series of superimposed and counterpart filter-sections, of which there may be an indefinite number to correspond to the capacity of the filter, the uppermost one being provided with a cover-plate 8 and all formed with guide-lugs 9 9 to straddle the vertical arms of the yoke. The cover-plate has orificed ears 10 10, which are alined with corresponding ears 12 12 on the bottom section 6 to receive the clamping-bolts 13 13, which, in connection with the hand-screws 14 14 in the bridge of the yoke, serve to clamp the contiguous edges of the bottom section, the cover, and the intermediate filter-sections together, so as to form air-tight joints between them and at the same time permit of their convenient dismemberment when necessary to cleanse and repack the filter.

As hereinbefore stated, the intermediate sections are counterpart, and consequently the description of one will answer for all. Each section consists of an annular pan or vessel formed with an imperforate bottom 15 and an annular encompassing flange 16, the upper edge of which is formed with a continuous groove 17 to receive the gasket or packing 18, and its lower edge is formed with an annular shoulder 19, which forms a joint with the gasket 18 of the contiguous section beneath. The inner wall of the section is formed with a continuously-grooved annular shoulder 20 to receive the gasket 21, on which the foraminous filter-plate 22 rests, the bottom face of which is provided with a series of mutilated ribs 23, (these ribs are so placed as not to close any of the perforations,) which rest on the upper face of the imperforate bottom 15 of the section to support said plate in position when the filter is packed, which is accomplished by filling the space above said foraminous plate with shredded asbestos, filter mass, or a like material or mixtures of the same, and then placing on top of said material a disk of felt, cloth, or some similar fabric 25, then pressing them down tightly to a level slightly below the top of the encompassing flange 16. The perforations 23' in the foraminous plate are funnel-shaped to afford a large drainage area under the filtering media, and none of them are closed by the supporting-ribs.

It will be noted that the bottom faces of the intermediate sections and likewise that of the cover are provided with a series of intersecting mutilated ribs 24 24, which rest upon the fabric 25 to retain it and the other filtering medium in place. These ribs cover much less filtering-surface than perforated plates would. Consequently the capacity of the filter is greatly increased. As shown in Figs. 5 and 6, the bottom faces of these sections and that of the cover are each provided with a circular border-flange 24', having an aperture at one point for the ale to pass through it. Said flange 24' rests on the cloth, filter mass, &c., above the corresponding circular imperforate rim 22' of the filter-plate. (Shown in Fig. 7.)

Each filtering-section is formed with a radial duplex coupling 26 28, as shown in Fig. 4, the member 26 being formed with a vertical passage 29, from which an inlet-port 30 communicates with the interior of the filter-section above the fabric 25, and the member 28 is also formed with a vertical passage-way 31 and a lateral opening 32, which communicates with the outlet-port 33 by means of the pipe 34, the port opening into the filter-section below the foraminous plate. The pipe 34 is provided with a plug-cock 35 and with an open-work cage 36, in which is inserted a short section of glass tubing 37, so that the filtered ale or beer may be visually inspected as it leaves each filter-section, and thus it may be ascertained if each compartment is performing its work in a proper manner.

When the filter is assembled, as shown in Fig. 1, suitable packing being of course placed between the contiguous plane faces of the couplings, the entire series of alined members 26 constitute a continuous inlet-pipe 26' and the corresponding series of alined members 28 likewise form a continuous outlet-pipe 28'. The lower end of the inlet-pipe 26' is connected with a supply-pipe 38, which communicates with the ale or beer tank, (not shown,) and its upper end with a vent-pipe 38', extending to the top of said tank, whereby the disengaged gas is carried out of the filter and returned to the beer-tank, thereby avoiding the necessity for a gas-trap or other similar device. The lower end of the outlet-pipe 28 is also provided with a discharge-pipe 39, which communicates with a racker or a racking-tank, (not shown,) and its upper end with a vent-pipe 39', which also communicates with said racker or racking-tank, thereby avoiding the use of a gas-trap and the attention it requires. The upper ends of both the vertical inlet and outlet pipes are provided with pressure-gages, as shown, and the inlet-pipe is in addition provided with a thermometer, the object of the pressure and heat gages being obvious.

In operation the ale or beer from the tank passes through the supply-pipe 38 and through the vertical inlet-pipe 26' and ports 30 into the filter-sections, thence downwardly through the cloth fabric, asbestos, or other filtering material and foraminous plate into the bottom of each filter-section, from which the filtered ale escapes through the outlet-ports 33 and pipes 34 into the vertical outlet-pipe 28', and thence through the discharge-pipe 39 to the racker or racking-tank, the air and disengaged gases escaping through the vent-pipes 38' and 39'.

As above described, the filtering process is conducted downwardly; but it may just as easily be conducted upwardly by reversing the filter on its trunnions, or horizontally, if desired, by adjusting the filter proper to a corresponding position. In case it is desired to filter upwardly the position of the beer-pipes and the vent-pipes will have to be reversed and the location of the pressure-gages and the thermometer correspondingly changed.

A filter thus constructed possesses many advantages in point of utility. Its capacity is practically unlimited. It may be increased or diminished by the addition of or removal of filter-sections, and the result of the work of each individual compartment is always open to inspection. It is both portable and reversible, and it can be thoroughly and rapidly cleaned out by passing steam and hot water in the reverse direction through the filtering-compartments, and it can be conveniently taken apart and easily and quickly repacked and made ready for use, or any single compartment doing defective work may be closed without disturbing the others.

It will of course be understood that various changes in the form, proportion, and the minor details of construction may be resorted to without departing from the principle or sacrificing any of the advantages of this invention.

Having now fully described the invention, what I claim, and desire to secure by Letters Patent, is—

1. A filter comprising a portable carriage, a yoke provided with trunnions journaled in said carriage, hand-wheels and screws, and filter-sections removably secured to said yoke by said hand-wheels and screws, substantially as and for the purpose set forth.

2. A filter comprising a portable supporting-carriage, a yoke journaled to rotate in said carriage, a filter-body mounted in said yoke, and means for clamping said filter-body to said yoke, substantially as and for the purpose set forth.

3. A filter comprising a series of parallel filter-sections provided with guide-lugs, a yoke adapted to bind together and support said filter-sections, and a support to which said yoke is journaled to rotate, whereby it may be reversed when desired, substantially as and for the purpose set forth.

4. A filter comprising a series of parallel filter-sections and an encompassing yoke adapted to support said sections, and means carried by said yoke to clamp the sections together and secure them to said yoke, substantially as and for the purpose set forth.

5. A filter comprising a series of superimposed independent filter-sections so arranged that the bottom of each intermediate section forms the top of the contiguous lower section, and provided with integral parts resting on the filtering media and keeping it in place on the foraminous plate beneath it, substantially as and for the purpose set forth.

6. A filter comprising a series of parallel filtering-sections, each section having independent and separate inlet and outlet ports above its bottom, and means for simultaneously connecting and disconnecting said sections, substantially as and for the purpose set forth.

7. A filter comprising a series of parallel filtering-sections having independent inlet and outlet ports, an inlet-pipe common to all the inlet-ports, an outlet-pipe common to all the outlet-ports, and independent vent-pipes leading from said inlet and outlet pipes, substantially as and for the purpose set forth.

8. A filter comprising a series of parallel filtering-sections having common inlet and outlet ports, and a vent-pipe leading from said outlet-ports to the racker, or a racking-tank, substantially as and for the purpose set forth.

9. A filter having inlet and outlet ports, and a vent-pipe leading from said outlet-port to the racker, or a racking-tank, substantially as and for the purpose set forth.

10. A beer and ale filter provided with an inlet-pipe leading from the beer tank or vessel; in combination with a vent-pipe connecting the top of the filter or its sections with the space above the beer in said tank or vessel, substantially as and for the purpose set forth.

11. A beer and ale filter provided with an inlet-pipe leading from the beer-tank to the filter; in combination with a vent-pipe connecting the top of said inlet-pipe and beer-tank, substantially as and for the purpose set forth.

12. A filter comprising a series of parallel sections, a gasket interposed between the contiguous sections, and a rotating yoke provided with screws and hand-wheels for simultaneously securing said sections together and to form air-tight joints between them, substantially as and for the purpose set forth.

13. A filter comprising a series of filter-sections, gaskets, a yoke, hand-wheels, and screws and rods for simultaneously forming air-tight joints between the contiguous sections, substantially as and for the purpose set forth.

14. A filter comprising a series of independent filter-sections provided with individual inlet and outlet ports, stationary gaskets, and means for simultaneously forming air-tight joints between said sections and their corresponding radial duplex couplings, substantially as and for the purpose set forth.

15. A filter-compartment formed with an inlet and an outlet port; in combination with a valved branch pipe leading from said outlet-port to the common outlet-pipe and provided with a transparent section, substantially as and for the purpose set forth.

16. A filter-section formed with independent inlet and outlet ports, and a valved branch pipe leading from said outlet-port to the common outlet-pipe, substantially as and for the purpose set forth.

17. A filter-section formed with independent inlet and outlet ports, and a valved pipe leading from said outlet-port to a common pipe and having an intermediate transparent section, substantially as and for the purpose set forth.

18. A filter-section comprising an annular pan with an imperforate bottom, inlet and outlet ports both in the side of the pan above said bottom, and an internal annular shoulder, substantially as and for the purpose set forth.

19. A filter-section comprising a pan with inlet and outlet ports through its side above its bottom, an internal annular shoulder, and a foraminous plate, substantially as and for the purpose set forth.

20. A filter-section comprising an imperforate bottom provided on its lower face with mutilated ribs, and a continuous encompassing wall formed with an internal annular shoulder, substantially as and for the purpose set forth.

21. A filter-section comprising an imperforate bottom formed with mutilated ribs, and an encompassing wall having its upper edge terminating in a grooved shoulder and its lower edge with a plain shoulder, and having its inner wall formed with a continuous grooved shoulder, substantially as and for the purpose set forth.

22. In a filter of the class described, a diaphragm provided with a series of inverted cone-shaped orifices, a series of ribs arranged between the orifices and integral with the solid portion of the diaphragm, substantially as and for the purpose set forth.

23. A filter comprising a series of independent filtering-sections provided with individual inlet and outlet ports, a supply-pipe common to all the inlet-ports, a discharge-pipe common to all the outlet-ports, and a series of independent valved branch pipes connecting said individual outlet-ports with said common discharge-pipe, substantially as and for the purpose set forth.

24. A filter comprising a series of independent filtering-sections provided with individual inlet and outlet ports, a supply-pipe common to all the inlet-ports, a discharge-pipe common to all the outlet-ports, a series of independent branch pipes connecting said outlet-ports and discharge-pipe, and means whereby the liquid may be visually inspected during its passage through said branch pipes, substantially as and for the purpose set forth.

25. A filter comprising a series of independent superimposed filtering-sections, each section being formed with an imperforate bottom provided on its lower face with mutilated intersecting ribs, and an internal annular shoulder; in combination with a foraminous diaphragm also formed with mutilated ribs, and a filtering medium interposed between said diaphragm and the bottom of the superimposed contiguous sections, substantially as and for the purpose set forth.

26. A filter comprising a series of superimposed independent filtering-sections, each section being provided with independent inlet and outlet ports through its side above its bottom, a foraminous diaphragm provided with vertical flanges or ribs for supports, and with an imperforate border interposed between said ports, substantially as and for the purpose set forth.

27. A filter comprising a series of independent filter-sections provided with independent individual inlet and outlet ports above the bottom of each section, stationary gaskets in grooves, and means for simultaneously forming air-tight joints between said sections, substantially as and for the purpose set forth.

28. In a filter, an upper filter-section comprising a pan-shaped vessel with inlet and outlet ports and a foraminous plate; in combination with a plate or cover provided with integral parts on its lower face resting on and holding down the filtering media, substantially as and for the purpose set forth.

29. A filter-section comprising a pan-shaped vessel with an imperforate bottom and an internal shoulder with a gasket and foraminous plate resting thereon, substantially as and for the purpose set forth.

In testimony whereof I have hereunto set my hand in the presence of two subscribing witnesses.

ALFRED E. FEROE.

Witnesses:
IRVING ELTING,
C. W. H. ARNOLD.